UNITED STATES PATENT OFFICE.

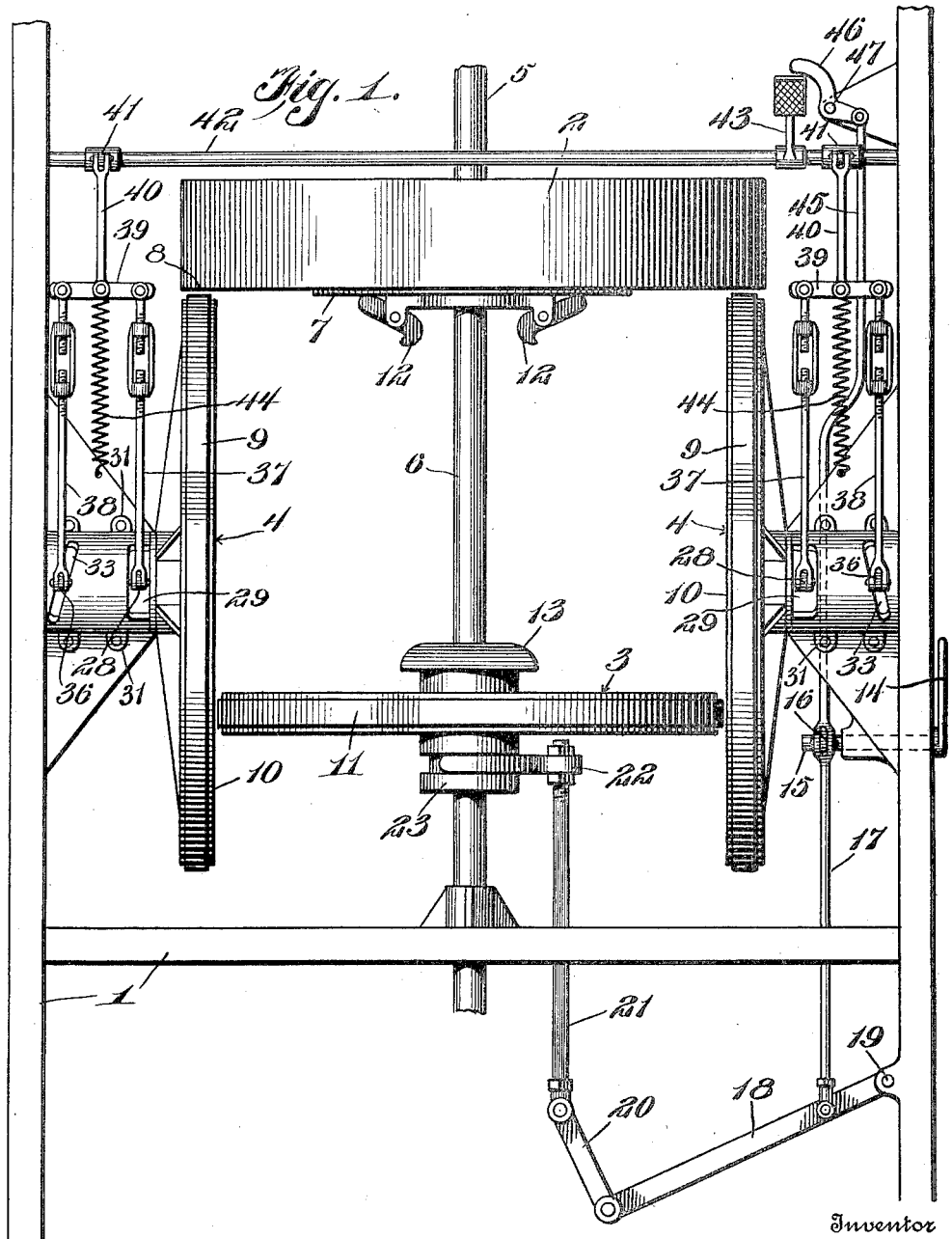

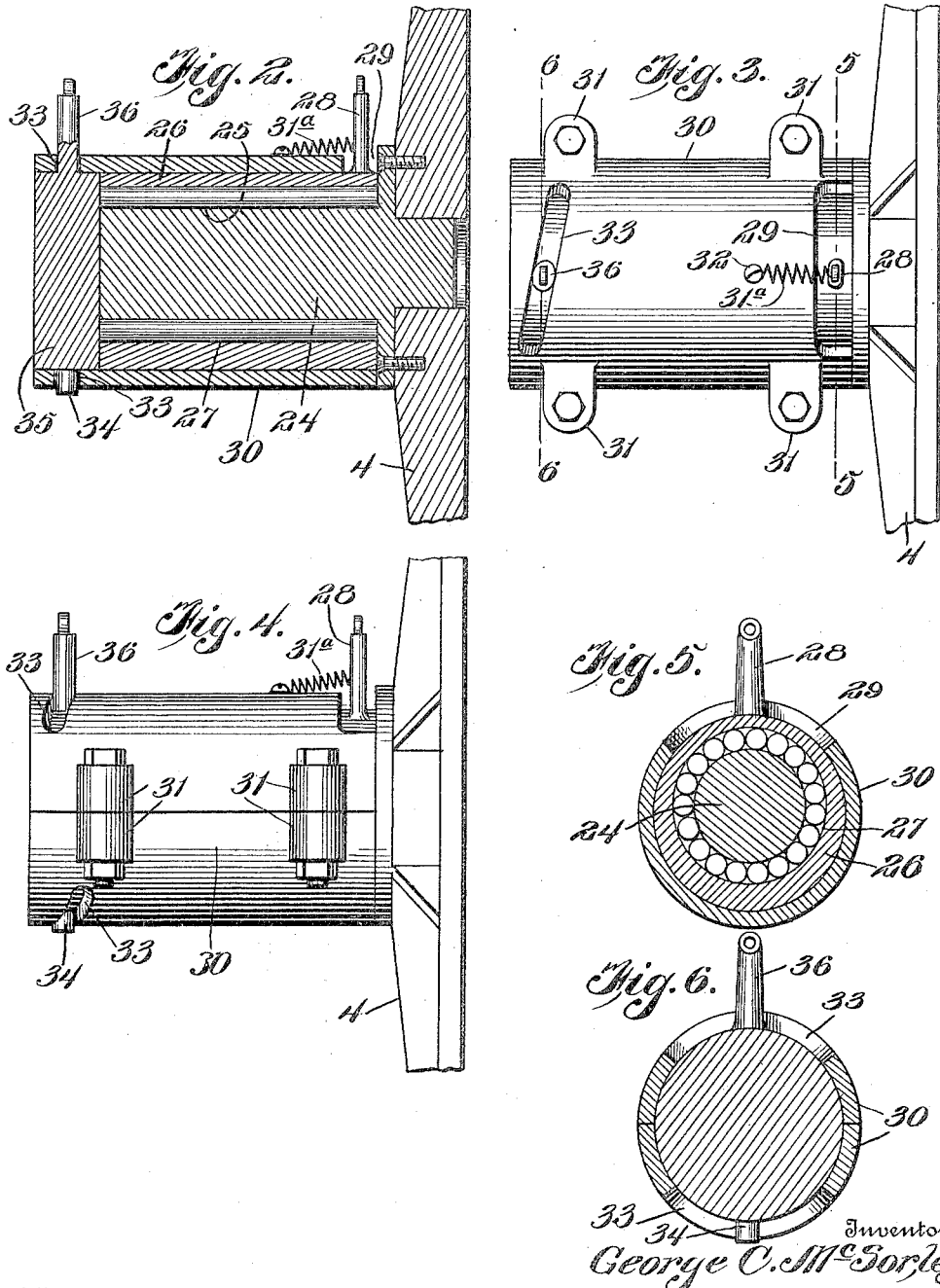

GEORGE C. McSORLEY, OF LANSING, MICHIGAN, ASSIGNOR OF ONE-HALF TO JOSIAH BLACK, OF LANSING, MICHIGAN.

TRANSMISSION-GEARING.

1,232,349.　　　　　Specification of Letters Patent.　　　Patented July 3, 1917.

Application filed April 1, 1916. Serial No. 88,286.

*To all whom it may concern:*

Be it known that I, GEORGE C. McSORLEY, a citizen of the United States, residing at Lansing, in the county of Ingham and State of Michigan, have invented new and useful Improvements in Transmission-Gearings, of which the following is a specification.

This invention relates to transmission gearing, the same being especially designed with reference to the use thereof in connection with motor vehicles of all kinds, but it will be apparent as the description proceeds that the transmission gearing is applicable in other relations or wherever it is required to change the ratio of speed between a driving shaft and a driven shaft or between a driving wheel and a driven wheel.

The object of the invention is to provide in connection with a driving wheel and a driven wheel having coincident axes, of one or more transmission wheels adapted to be actuated by the driving wheel and to actuate the driven wheel, combined with means for shifting said transmission wheels toward and away from one face of the driving wheel and also toward and away from the working face of the driven wheel, together with equalizing means, whereby the driving engagement between the transmission wheels and the driving wheel and also between the transmission wheels and the driven wheel may be accurately and equally distributed.

A further object of the invention is to provide in connection with means for shifting the driven wheel toward and away from the driving wheel, and clutching means between said driving and driven wheels to secure what is known as direct drive, locking means controlled by the means for shifting the driven wheel, whereby the means for shifting the transmission wheels is locked when the driven wheel is thrown into direct clutched engagement with the driving wheel and released when the driven wheel is moved out of clutched engagement with the driving wheel.

With the above and other objects in view, the invention consists in the novel construction, combination and arrangement of parts, as herein described, illustrated and claimed.

In the accompanying drawings:—

Figure 1 is a plan view illustrating the transmission gearing of this invention, showing the same in neutral or non-active position.

Fig. 2 is an enlarged fragmentary section through one of the transmission wheel shifting mechanisms taken longitudinally of the transmission wheel shaft.

Fig. 3 is a plan view of the same.

Fig. 4 is a side elevation of the same.

Fig. 5 is a section on the line 5—5 of Fig. 3.

Fig. 6 is a section on the line 6—6 of Fig. 3.

Referring to the drawings 1 designates a frame for supporting different elements of the transmission gearing hereinafter particularly described. 2 represents the driving wheel, 3 the driven wheel, 4 the transmission wheels. As applied to automobile driving mechanism, 5 represents the engine shaft or an extension thereof, 2 represents the fly wheel as above specified and to be hereinafter referred to as the driving wheel, and 6 represents the driven shaft which leads from the clutch 7 to the differential gearing at the junction of the driving shaft 6 and the rear axle (not shown).

The driving wheel 2 is preferably provided with an annular friction shoe 8 and each of the transmission wheels 4 is provided on the periphery thereof with a friction shoe 9 and also on the inner side face thereof with a friction plate or face 10, while the driven wheel 3 is provided with a friction shoe 11 on the periphery thereof. Thus the transmission wheels 4 are adapted to be driven by frictional contact with the adjacent face of the driving wheel 2 and are adapted to drive the driven wheel 3 by reason of the contact between the inner faces of the transmission wheels 4 and the periphery of the driven wheel 3.

The clutch 7 which is preferably of the multiple disk type is provided with the usual clutch dogs 12 while the driven wheel 3 has the hub thereof provided with a substantially conical clutch collar 13 adapted to engage and spread the dogs 12 for the purpose of throwing the clutch 7 into working position. When the collar 13 is withdrawn from between the dogs 12, the clutch 7 is relaxed. The means for shifting the wheel 3 comprises a manually controlled lever 14 mounted on a short transverse shaft 15 having an arm 16 from which a link 17 extends to a lever 18 pivotally mounted at 19 and connected at its free end by means of a link 20 to a fork shifting rod 21 carrying at one end a fork 22 which engages a grooved collar 23 shown as consisting of an extension of the hub of the driven wheel 3.

Each of the transmission wheels 4 has a short shaft 24 projecting from the outer side thereof and journaled in a bushing 25 in an oscillatory sleeve 26, the shaft receiving bore 27 of which is eccentric in relation to said sleeve. Therefore, when the sleeve 26 is oscillated in one direction or the other, the transmission wheel 4 is either advanced toward or moved away from the driving wheel 2. In order to oscillate the sleeve 26, the latter is provided with an arm 28 which extends outwardly through a slot 29 in a stationary casing or bearing 30, the latter being preferably split longitudinally and the sections thereof being formed with bolt-receiving lugs 31 to enable the sections of the casing to be fastened together and separated from each other when required. A retracting spring 31ª is connected at one extremity to the arm 28 and is fastened at its other extremity to a fixed point 32 on the outside of the casing 30. The spring 31 yieldingly holds the lever 28 in such position that the adjacent transmission wheel 4 is out of engagement with the driving wheel 2. The casing 30 is also provided with other slots 33 extending obliquely as indicated in Figs. 3 and 4, one of said slots receiving a stud or projection 34 on a thrust block 35, and the other slot receiving a thrust block operating arm 36. When the block 35 is oscillated in one direction, it serves to thrust the shaft 24 inwardly and when turned in the opposite direction, the shaft 24 is allowed to move in an outward direction. Connected to the arm 28 is a longitudinally extensible compensating link 37, a similar compensating link 38 being attached to the arm 36. At their opposite ends the links 37 and 38 are pivotally connected to an equalizing lever 39 in turn connected by a link 40 to one of a pair of arms 41 on a rock shaft 42. The connections just described are duplicated at both sides of the gearing as shown in Fig. 1, the shaft 42 being rocked by means of a lever 43 which may be termed the gear shifting lever. Each of the equalizing levers 39 has attached thereto a retracting spring 44 the other end of which is connected to a fixed point, the springs 44 therefore acting to move the equalizing levers 39 and return the arms 28 and 36 to their non-operative positions.

The means for locking the gear shifting mechanism is shown as comprising a pull and thrust member 45 which is connected to an arm on the shaft 15 and pivotally connected at its opposite end to a locking dog 46 which is pivotally mounted between the ends thereof at 47. The free end of the locking dog 46 is adapted to move into a position to obstruct and prevent movement of the lever 43 when the driven wheel 3 has been shifted into clutched engagement with the driving wheel 2. As the driven wheel 3 is moved out of clutched engagement with the driving wheel 2, the dog 46 is moved away from its obstructing position.

From the foregoing description, taken in connection with the accompanying drawings, the operation of the transmission gearing will now be understood. Assuming that the shaft 5 is constantly revolving and turning the driving wheel 2, when the driven shaft 6 and its wheel 3 are not rotating, the transmission wheels 4 are out of driving contact with the driving wheel and also out of driving contact with the driven wheel. By pressing on the lever 43, the transmission wheels 4 are simultaneously shifted into driving engagement with the driving wheel and also into driving engagement with the driven wheel, this being done after the driven wheel has been adjusted into the desired relation to the transmission wheels 4. By moving the driven wheel to one side of the center of the transmission wheels, the mechanism when used in an automobile, effects a forward movement of the machine and when the driven wheel 3 is shifted to the opposite side of the centers of the transmission wheels, the machine is driven in a reverse direction; the speed of the driven shaft 6 varies in accordance with the distance of the driven wheel 3 from the center of the transmission wheels 4. When the driven wheel 3 is clutched directly to the driving wheel 2, what is known as a direct drive is obtained and when the parts are in this position, the gear shifting lever 4 is locked against movement and cannot be moved to shift the gears until after the driven wheel 3 has been unclutched from the driving wheel 2.

Having thus described my invention, I claim :—

1. Transmission gearing embodying in combination, a driving wheel, a driven wheel in axial alinement with the driving wheel, transmission wheels having their axes at a right angle to the axes of the driving and driven wheels, means for shifting said transmission wheels toward and away from one side face of the driving wheel, means for shifting said transmission wheels toward and away from the periphery of the driven wheel, equalizing means between the two last named means, a manually operable lever and connections for shifting the driven wheel toward and away from the driving wheel, direct drive clutching means between the driving and driven wheels, and means controlled by said lever for locking and releasing the shifting means of the transmission wheels.

2. Transmission gearing embodying in combination, a driving wheel, a driven wheel in axial alinement with the driving wheel, a transmission wheel having its axis at a right angle to the axes of the driving and driven wheels, means for shifting said transmission wheel toward and away from one side face of the driving wheel, means for shifting said transmission wheel toward and away from the periphery of the driven wheel, equalizing means between the two last named means, a manually operable lever and connections for shifting the driven wheel toward and away from the driving wheel, direct drive clutching means between the driving and driven wheels, and means controlled by said lever for locking and releasing the shifting means of the transmission wheel.

In testimony whereof I affix my signature in presence of two witnesses.

GEORGE C. McSORLEY.

Witnesses:
 WALTER F. BOOS,
 MABEL PARSONS.

Copies of this patent may be obtained for five cents each, by addressing the "Commissioner of Patents, Washington, D. C."